United States Patent [19]

Burrough et al.

[11] 4,378,861
[45] Apr. 5, 1983

[54] ESCAPE SLIDES

[75] Inventors: Philip M. Burrough, Liss; David V. Edwards, Loxwood, both of England

[73] Assignee: RFD Inflatables Limited, Surrey, England

[21] Appl. No.: 198,222

[22] Filed: Oct. 17, 1980

[30] Foreign Application Priority Data

Oct. 19, 1979 [GB] United Kingdom ............... 7936453

[51] Int. Cl.³ .................... A62B 1/20; B64C 1/22; B64D 1/08
[52] U.S. Cl. .................... 182/48; 244/137 P; 244/DIG. 2; 193/25 C
[58] Field of Search ............ 182/48, 49; 193/25 R, 193/25 C; 66/193; 244/DIG. 2, 137 P

[56] References Cited

U.S. PATENT DOCUMENTS

| 395,455 | 1/1889 | Reiss et al. | 182/48 |
| 1,013,506 | 1/1912 | Miller et al. | 193/25 R |
| 1,139,343 | 5/1915 | Clewley | 66/193 |
| 3,829,353 | 8/1974 | Fisher | 182/48 |
| 4,005,762 | 2/1977 | Zephinie | 182/48 |
| 4,274,526 | 6/1981 | Sims | 182/48 |

Primary Examiner—Reinaldo P. Machado
Attorney, Agent, or Firm—Birch, Stewart, Kolasch & Birch

[57] ABSTRACT

An escape slide arranged to provide an inclined descent path for evacuees, the slide includes a support structure and a slideway supported thereby, the slideway includes a sheet of flexible material provided with holes through which water drains. The sheet preferably comprises a warp knitted fabric net.

13 Claims, 7 Drawing Figures

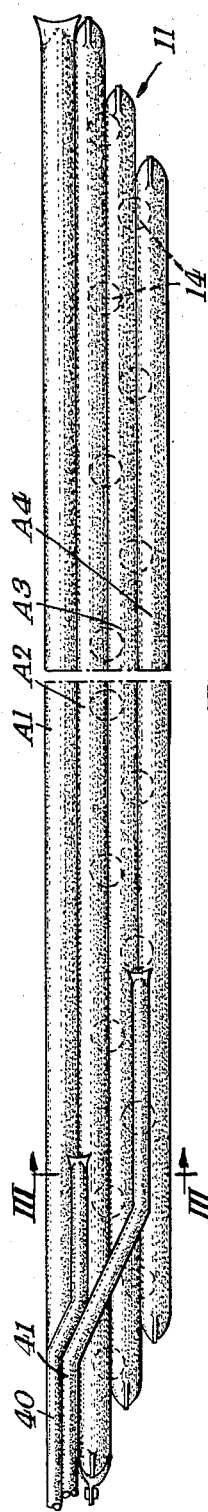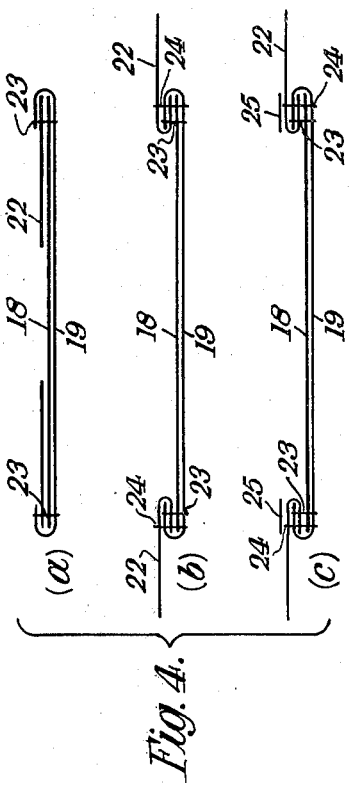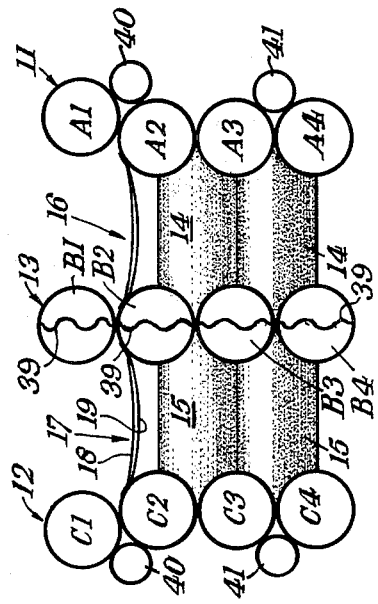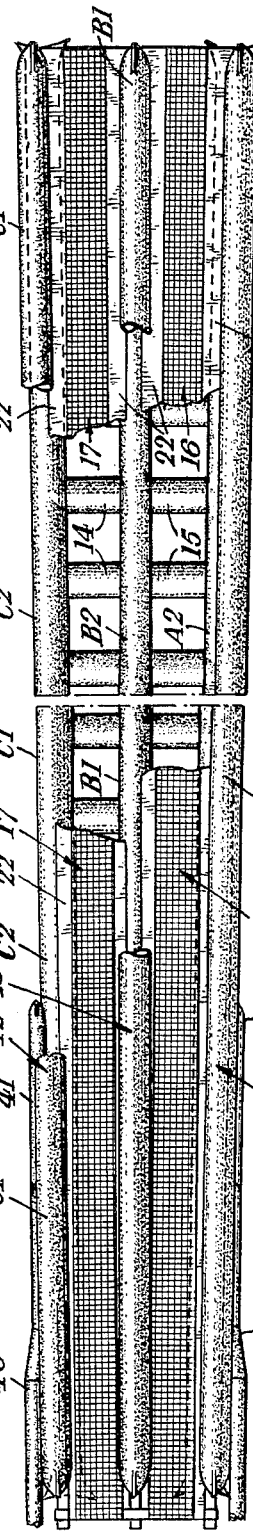

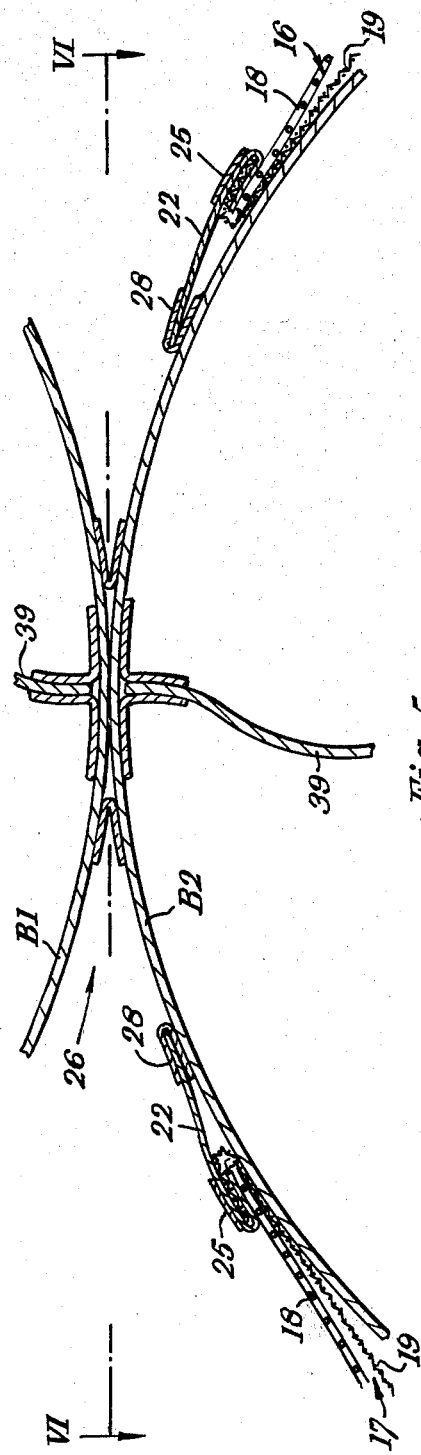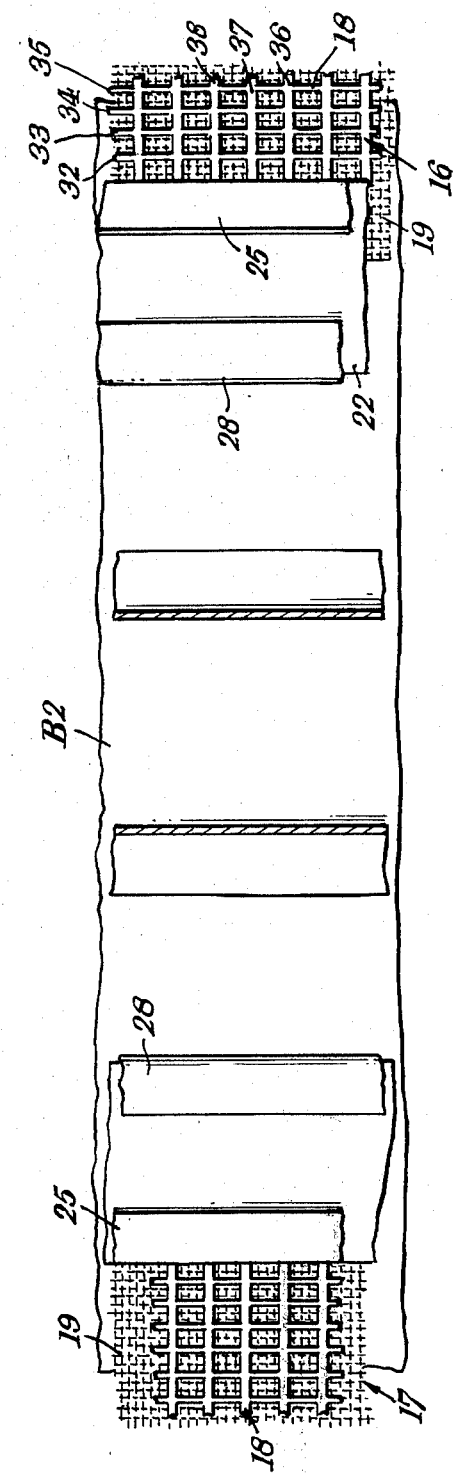

ESCAPE SLIDES

BACKGROUND AND SUMMARY OF THE INVENTION

The present invention relates to escape slides used, for example, for the evacuation of persons from ships, aircraft and buildings.

In escape slides hitherto proposed, use is made of a slideway of a flexible impervious sheet, the choice of material for the sheet and the slide angle determining the speed at which a person will descend on the slide. When the slideway is wet from rain at the time of use, it offers a very slippery surface to persons using it, giving rise to an alarming and hazardous increase in descent speed. With long slides, particularly slides used on ships, it is particularly important to arrange for the speed of descent to be controlled so as to ensure that persons using the slide arrive at the end of the slide at a speed not in excess of a predetermined safe speed.

According to the present invention, there is provided an escape slide arranged to provide an inclined descent path for evacuees, the slide comprising support structure and a slideway supported thereby, the slideway comprising a sheet of flexible material provided with holes through which water drains.

The slideway sheet in the escape slide according to the invention may be in the form of a textile fabric and in a preferred embodiment of the invention the fabric is a warp knitted fabric knitted from high tenacity synthetic continuous filament yarn and so arranged in the slide that the warp threads of the fabric extend along the length of the slide.

The warp knitted fabric preferably takes the form of a net produced by warp knitting looping yarns with in-laying yarns to form warp threads and traversing the in-laying yarns to other warp threads to form the weft threads.

The slideway in the embodiment of the invention hereinafter to be described further comprises a woven fabric arranged in such spaced relation beneath the warp knitted fabric as to permit drainage of water through the warp knitted fabric while serving as a support therefor when the warp knitted fabric distends under load during use of the slide. The woven fabric is preferably woven from continuous filament yarn with each of the warp and weft threads of the fabric comprising a plurality of untwisted continuous filaments. The woven fabric is likewise so arranged in the slide that the warp threads extend along the length of the slide and preferably the number of filaments in the weft thread is greater than the number of filaments in the warp thread.

In the preferred embodiment of the invention the support structure of the slide includes support walls with the slideway fabrics joined along their longitudinal edges and to opposing faces of the support walls. Each support wall is formed by a plurality of superposed inflatable tubes extending along the length of the slide, with the slideway fabrics secured at their longitudinal edges to a pair of opposing wall tubes next below the uppermost pair of opposing wall tubes so that the latter serve as guides for evacuees using the slide.

BRIEF DESCRIPTION OF THE INVENTION

One embodiment of the invention will now be described by way of example with reference to the accompanying drawings in which:

FIG. 1 is a side elevation of an inflatable escape slide according to the invention, FIG. 2 is a plan view of the escape slide shown in FIG. 1 with parts of the slide broken away, FIG. 3 is a section of the slide shown in FIG. 1, taken on the line III—III in FIG. 1 and drawn to an enlarged scale, FIG. 4 comprises three diagrammatic sections a, b and c illustrating the method of construction of the slideway forming part of the slide shown in FIGS. 1 to 3, FIG. 5 is an enlarged scrap section, taken from FIG. 3, FIG. 6 is a sectional plan view of the part of the slide shown in FIG. 5, taken on the line VI—VI in FIG. 5, and FIG. 7 is a diagrammatic plan view drawn to a greatly enlarged scale of the warp knitted fabric forming part of the slideway of the slide illustrated in FIGS. 1 to 3.

DETAILED DESCRIPTION OF THE INVENTION

Figure 7:
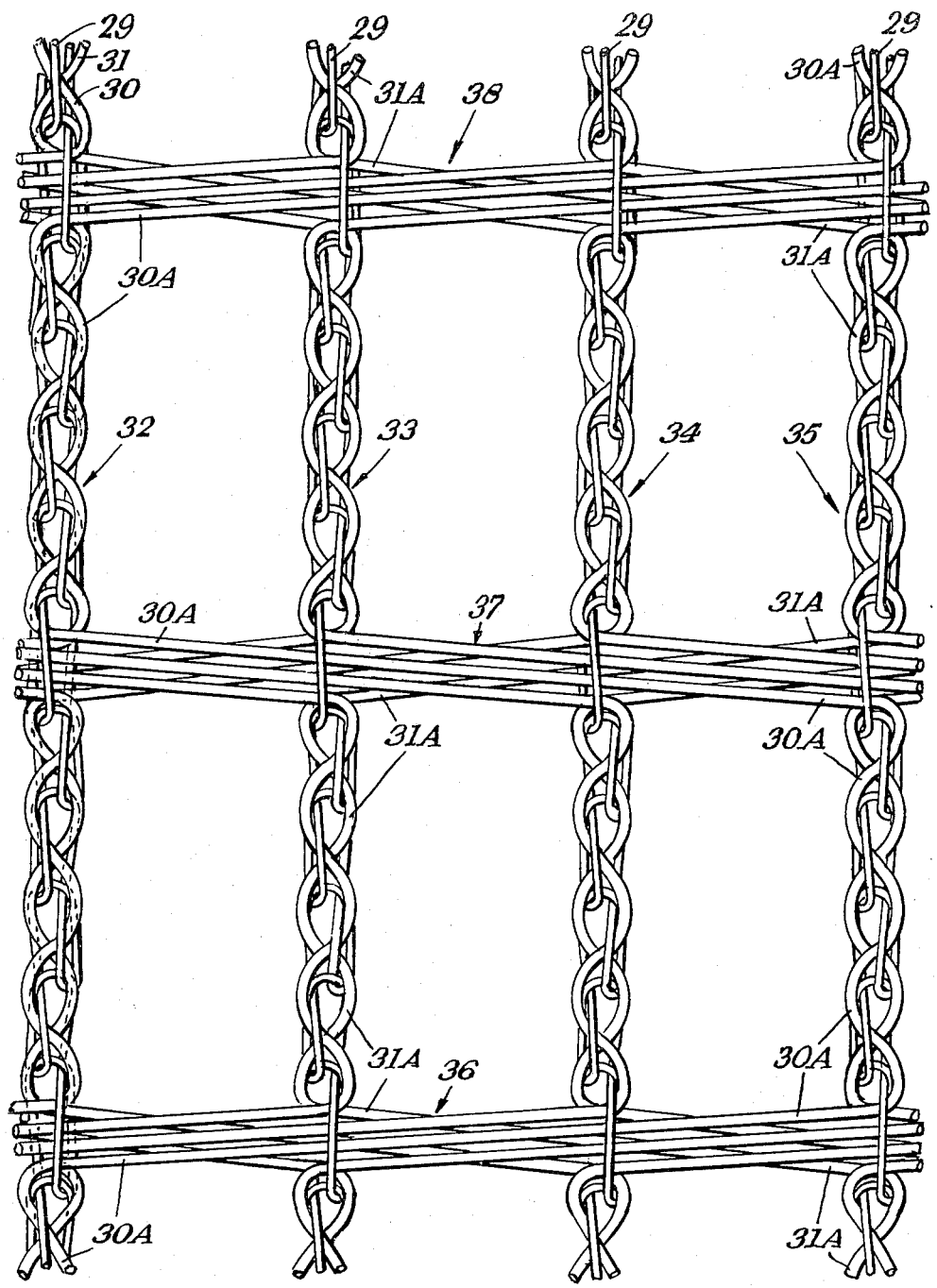

Referring first to FIGS. 1 to 3 of the drawings, the slide shown is constructed from twelve straight tubes in three banks of four tubes A1 to A4, B1 to B4 and C1 to C4. The two outside banks of tubes A1 to A4 and C1 to C4 make up outer walls 11 and 12 of the slide while the centre bank of tubes B1 to B4 makes up a centre wall 13 of the slide. The three walls 11, 12 and 13 are interconnected by inflatable sets of thwart tubes 14 and 15 arranged at regular intervals and in staggered relation along the length of the slide. As will be seen from FIG. 3, the thwart tubes 14 extend between the lowermost three tubes in the walls 11 and 13 while the thwart tubes 15 extend between the lowermost three tubes of the walls 12 and 13.

Two slideways 16 and 17 extend as shown between the tubes A2, B2 and C2 of the walls 11, 12 and 13. Each of the slideways 16 and 17 comprises upper and lower sheets 18 and 19 joined together along their longitudinal edges in a manner to be described with reference to FIG. 4 and joined to the support tubes A2, B2 and C2 in the manner to be described with reference to FIGS. 5 and 6. The upper sheet 18 is a warp knitted fabric in the form of a net having a construction hereinafter to be described in detail with reference to FIG. 7. The lower sheet 19 is formed as a woven fabric woven from continuous filament yarn and described in greater detail hereinafter.

Referring now to FIG. 4, the two sheets 18 and 19 and nylon fabric strips 22 are stitched together along their longitudinal edges as illustrated in FIG. 4(a) by stitching 23, with the lower sheet 19 being turned over at each edge to overlap both the upper sheet 18 and the support strip 22. The support strips 22 are then turned back on themselves and outwardly of the longitudinal edges of the two sheets 18 and 19 as illustrated in FIG. 4(b) and the assembly again stitched along each longitudinal edge as illustrated by stitching 24. Finally, a cover tape 25 is secured by adhesive along each longitudinal edge to cover the stitching as illustrated in FIG. 4(c).

Referring now to FIGS. 5 and 6, the support tube B2 of the centre support wall 13 forms with the support tube B1 a recess 26 in each side of the wall which is used to accommodate the inner longitudinal edges of each of the slideways 16 and 17, the fabric strip 22 engaging in and being secured by adhesive to a longitudinally extending V-shaped strip 28, itself secured to the tube B2 by adhesive. The other longitudinal edges of the slideways are secured in like manner to the support tubes A2 and C2 of the outer walls 11 and 12 and the arrangement is made such that, with the tubes forming the walls 11, 12 and 13 inflated as shown, the slideway sheets 18 and 19 take up suspended dispositions as shown with the upper sheet 18 being held in spaced relation to the lower sheet 19.

Referring now to FIG. 7, the sheet 18 is formed as a net by warp knitting looping yarns 29 with in-laying yarns 30 and 31 to form warp threads 32 to 35 and traversing the in-laying yarns 30 and 31 from one warp thread to another to form the weft threads 36 to 38. In particular, the in-laying yarn 30A in the warp thread 32 is caused to pass from the warp thread 32 along the weft thread 36 to the warp thread 35 in which it is knitted by the looping yarn 29 until it reaches the weft thread 37 where it traverses to the warp thread 32 in which it is again knitted into the warp thread 32 by the looping yarn 29 until it reaches the weft thread 38 where it traverses to the warp thread 35. Similarly, the in-laying yarn 31A passes from the knitted warp thread 35 to the warp thread 33 in which it is knitted until it reaches the weft thread 37 where it traverses back to the warp thread 35 in which it is knitted until it reaches the weft thread 38 where it traverses again to the warp thread 33.

The yarn used as the looping yarn and as the inlaying yarn in the present embodiment of the invention comprises a high tenacity continuous filament bright nylon 66 yarn of spinner's twist with normal spin finish. The yarn is made up into the net as illustrated in FIG. 7 and is then wet treated to remove the spin finish, heat set and finally proofed with a vinyl copolymer latex.

The fabric for the sheet 18 is made in continuous lengths for the full run of the slide, with the warp threads (32 to 35) extending along the length of the slide and the weft threads (36 to 38) extending across the slide, as illustrated in FIG. 6.

The lower sheet 19 of each of the slideways 16 and 17 is made up as a woven fabric woven from continuous filament yarn and in the preferred fabric the warp and weft threads each comprise yarn consisting of a plurality of continuous juxtaposed untwisted monofilaments. The weft is preferably formed from four filaments per thread and the warp from three filaments per thread. With this arrangement the fabric is made up into the sheet 19 so that the warp threads extend along the length of the slide.

It has been found that by using a slideway composed of upper and lower sheets as hereinbefore specifically described the rate of descent is better controlled, particularly in wet weather, when the water on it readily drains through the mesh. The mesh in the upper sheet 18 may be of relatively large size and in one specific embodiment the distance between weft threads of the net is 6.2 mm and the distance between the warp threads 5.6 mm.

The sheet 18 in the form of the net hereinbefore specifically described is however subject to deformation under loading obtained during the descent of evacuees. The lower sheet 19, which is a woven fabric net with a very much smaller mesh is provided to support the upper sheet at least momentarily during descent of an evacuee. While the lower sheet 19 will not clear water as rapidly as the upper sheet 18, the water cleared from the upper sheet 18 is channelled by the sheet 19 in the space between the upper and lower sheets for discharge at the lower end of the slide.

The slide hereinbefore described with reference to the drawings provides two slideways both of which may be used by evacuees in normal operation of the slide. To ensure that one slideway remains usable when components supporting the other slideway become damaged and deflate, the components supporting each slideway are inflatable independently of the components supporting the other slideway. In particular, the tubes B1 to B4 of the centre wall 13 are subdivided longitudinally by a flexible baffle 39 into non-communicating left and right-hand compartments. The right-hand compartments of the centre tubes B1 to B4 are in communication with each other, with the thwart tubes 14 and with the right-hand wall tubes A1 to A4 and all are arranged to be inflated from a first inflation system. The left-hand compartments are likewise in communication with each other, with the thwart tubes 15 and with the left-hand wall tubes C1 to C4 and all are arranged to be inflated from a second inflation system. Inflation of the slide is carried out by simultaneous actuation of the two inflation systems.

If one side of the slide is damaged or fails to inflate fully, the other side of the slide can only be made to work effectively as a slide if the centre wall tubes B1 to B4 are fully inflated. As soon as an attendant is aware of a softening of one side of the slide which affects its performance, he will actuate a reserve cylinder whereupon the baffles 18 move over toward the deflated side of the centre tubes B1 to B4 and the undamaged side of the slide becomes and remains usable for a period long enough to complete evacuation using the undamaged side of the slide.

The two sides of the slide are conveniently arranged to be inflated from their separate inflation systems through feed tubes 40, 41 on each side of the slide at the upper end thereof.

We claim:

1. An escape slide arranged to provide an inclined descent path for evacuees, the slide comprising support structure and a slideway supported thereby, the slideway comprising a first sheet of flexible material provided with holes through which water drains and a second sheet of a woven fabric arranged in such spaced relation beneath the first sheet as to permit drainage of water through the first sheet while serving as a support therefor when the first sheet distends under load during use of the slide by evacuees.

2. A slide according to claim 1 wherein the first sheet comprises a textile fabric.

3. A slide according to claim 2, wherein the fabric is a warp knitted fabric.

4. A slide according to claim 3 wherein the warp knitted fabric is knitted from a high tenacity synthetic continuous filament yarn of spinner's twist.

5. A slide according to claim 3, wherein the warp knitted fabric is so arranged in the slide that the warp threads extend along the length of the slide.

6. A slide according to claim 5, wherein the warp knitted fabric is in the form of a net.

7. A slide according to claim 6, wherein the net is formed by warp knitting looping yarns with inlaying yarns to form warp threads and traversing the in-laying yarns to other warp threads to form the weft threads.

8. A slide according to claim 2, wherein the woven fabric is woven from continuous filament yarns.

9. A slide according to claim 8, wherein each of the warp and weft threads comprises a plurality of continuous untwisted filaments.

10. A slide according to claim 9, wherein the number of filaments in the weft thread is greater than the number of filaments in the warp thread.

11. A slide according to claim 10, wherein the woven fabric is so arranged in the slide that the warp threads extend along the length of the slide.

12. A slide according to claim 2, wherein the support structure comprises support walls and wherein the slideway fabrics are joined along their longitudinal edges together and to opposing faces of the support walls.

13. A slide according to claim 12, wherein each support wall is formed by a plurality of superposed inflatable tubes extending along the length of the slide and wherein the slideway fabrics are secured at their longitudinal edges to a pair of opposing wall tubes next below the uppermost pair of opposing wall tubes so that the latter serve as guides for evacuees using the slide.

* * * * *